July 6, 1943.   W. H. SILVER   2,323,683
LISTED CORN CULTIVATOR
Filed Feb. 9, 1940   5 Sheets-Sheet 4

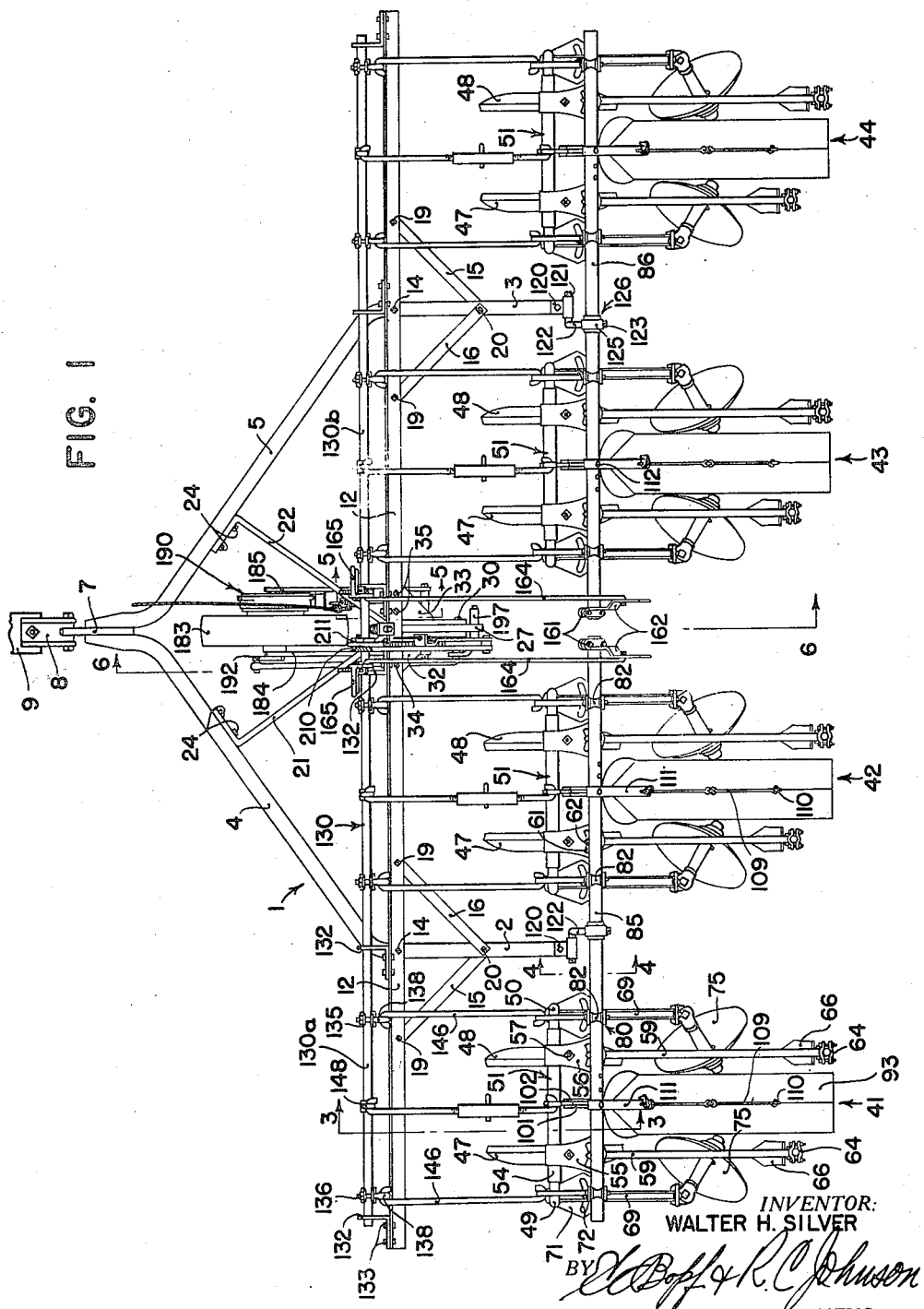

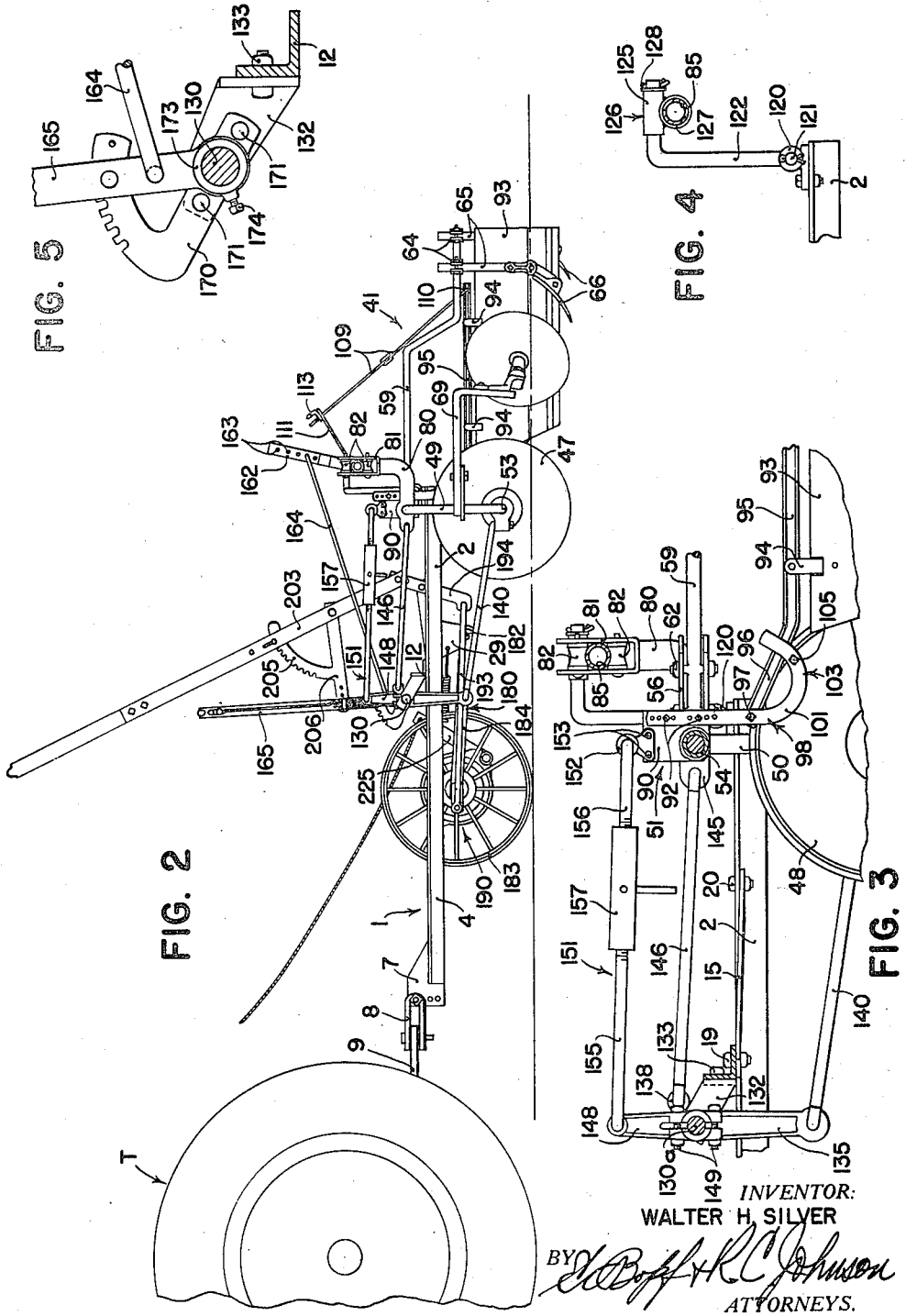

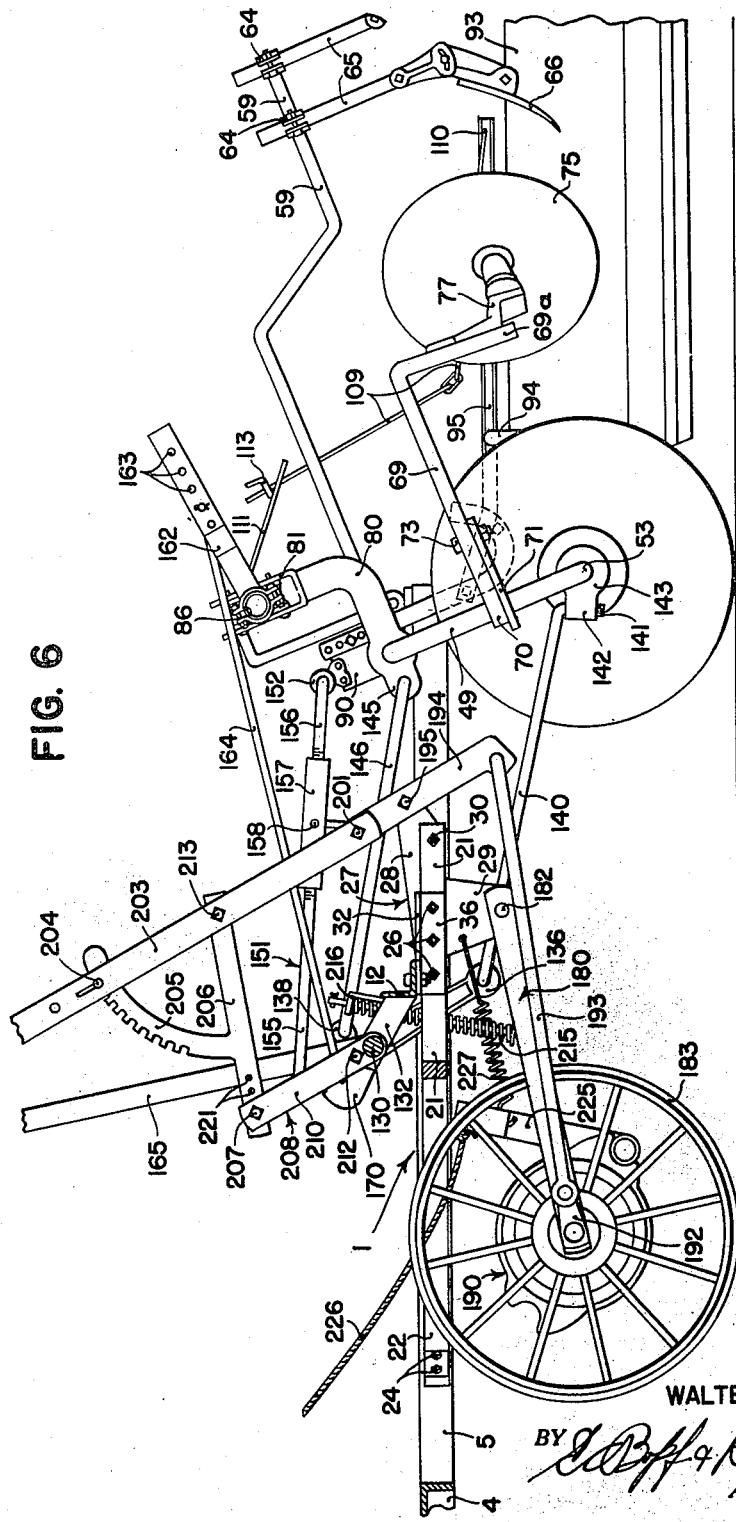

INVENTOR:
WALTER H. SILVER
ATTORNEYS.

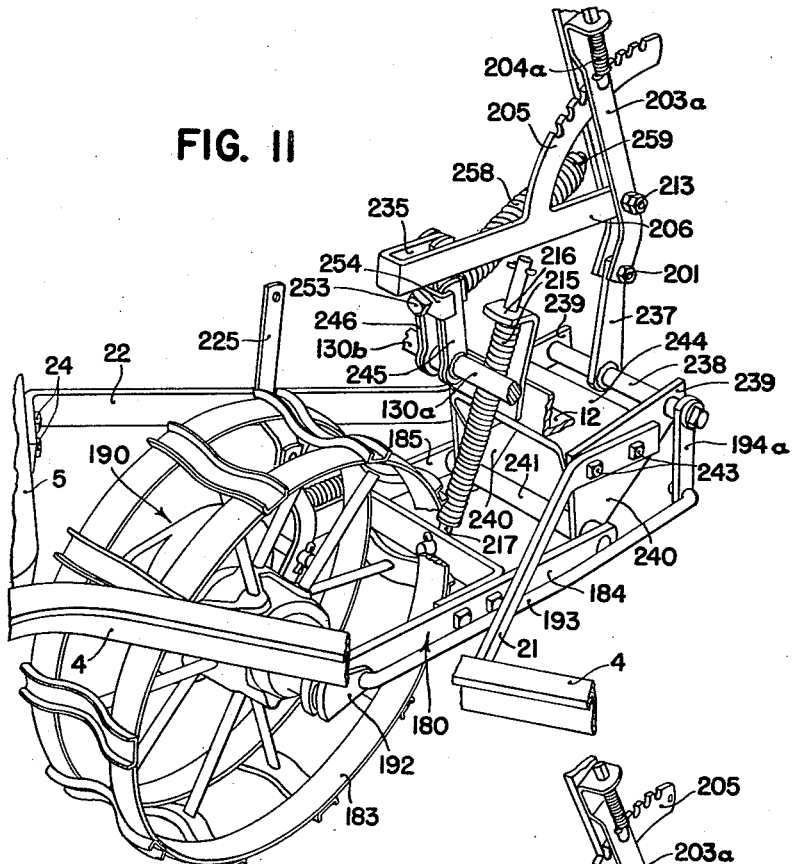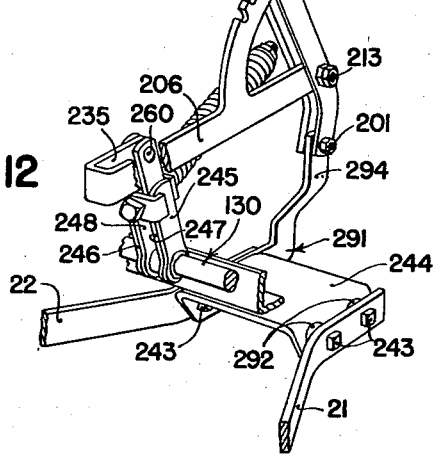

Patented July 6, 1943

2,323,683

UNITED STATES PATENT OFFICE 2,323,683

LISTED CORN CULTIVATOR

Walter H. Silver, Moline, Ill., assignor to Deere & Company, Moline, Ill., a corporation of Illinois Application February 9, 1940, Serial No. 318,063

62 Claims. (Cl. 97—143)

The present invention relates generally to agricultural implements and more particularly to lister cultivators and similar implements adapted to be propelled by a tractor.

The object and general nature of the present invention is the provision of a lister cultivator or the like wherein the rear end of the frame is supported upon the ground working units and the forward end is carried upon the propelling tractor, with a floating ground wheel operatively connected to raise and lower the ground working tools. More particularly it is a feature of this invention to provide a lister cultivator in which shields are provided for each of the lister cultivator gangs or units, and operatively controlled by a transverse rockable bar which, in addition, serves to stabilize the cultivator units while accommodating relative lateral movement of one with respect to the other. A further feature of the present invention resides in the provision of a lister cultivator having a frame that is adapted to be supported at its forward end on the tractor and carrying a transverse draft bar to which the lister cultivator units are pivotally connected by series of generally parallel links. In this connection it is a further feature of this invention to provide sets of parallel links connected with a rock shaft, with certain of the links connected substantially in line with the axis of the rock shaft while the other links are connected at the outer ends of arms fixed to and rockable with the rock shaft.

It is an additional feature of the present invention to provide an implement having one or more lister gangs or units connected with the implement frame by means of parallel links, certain of which may be adjusted so as to bring an operating tool or tools into the desired position relative to the other tools. It is also a feature of the present invention to provide a plurality of lister units which are adapted to be tilted in a vertical longitudinal plane for the purpose of raising and lowering the ground working tools, in connection with a pivoted shield, the position of which during operation may be changed by means that is independent of a means for tilting the various units. In this connection it is a further object of this invention to provide means engageable with the shield or shields to lift them into a transport position when the gangs are swung into their raised position, independent of the means for adjusting the position of the shields during operation.

A further feature of the present invention is the provision of an implement, such as a lister cultivator, wherein the parts for adjusting the operating depth are so constructed and arranged as to serve either as the raising and lowering means or to connect a ground wheel and power lift clutch mechanism to the parts to be raised and lowered. Still further, an additional feature of the present invention is the provision of a cushioned connection between the mechanism for raising and lowering the lister cultivating tools and the part that adjusts the tools, whereby the raising and lowering mechanism may move through a full range of movement, as when lowering the tools, while the entry of the tools into the ground may be temporarily delayed, thereby protecting the raising and lowering mechanism from shock.

A further feature of the present invention is the provision of new and improved connections between the rear end of the lister cultivator frame and the equalizing bar means whereby the raising and lowering of the cultivator tools are facilitated. It is also a feature of this invention to provide improved means for supporting the rear portion of the cultivator frame on the equalizing bar means.

These and other objects and advantages of the present invention will be apparent to those skilled in the art after a consideration of the following detailed description of the preferred structure in which the principles of the present invention have been incorporated and which is illustrated in the accompanying drawings.

In the drawings:

Figure 1 is a top or plan view of a four-row lister cultivator in which the present invention has been embodied;

Figure 2 is a side view of the implement shown in Figure 1;

Figure 3 is a sectional view taken along the line 3—3 of Figure 1, but at a larger scale, showing in particular the manner of supporting and adjusting the position of the shields;

Figure 4 is a sectional view taken at an enlarged scale along the line 4—4 of Figure 1, showing the manner of supporting the rear end of the draft frame on the equalizing bars to accommodate both lateral and longitudinal swinging movement;

Figure 5 is a sectional view taken along the line 5—5 of Figure 1, showing the manner of supporting the shield adjusting lever for rocking movement on the implement frame;

Figure 6 is a sectional view taken at an enlarged scale generally along the line 6—6 of Figure 1;

Figure 11 is a perspective view showing in detail the pivotal connection between the power lift wheel frame and the implement frame, with associated connections to the adjusting lever; and Figure 12 is a view similar to Figure 11 but showing the arrangement of the parts when the power lift unit is omitted and the adjusting lever utilized for raising and lowering the cultivator tools.

Figure 7:
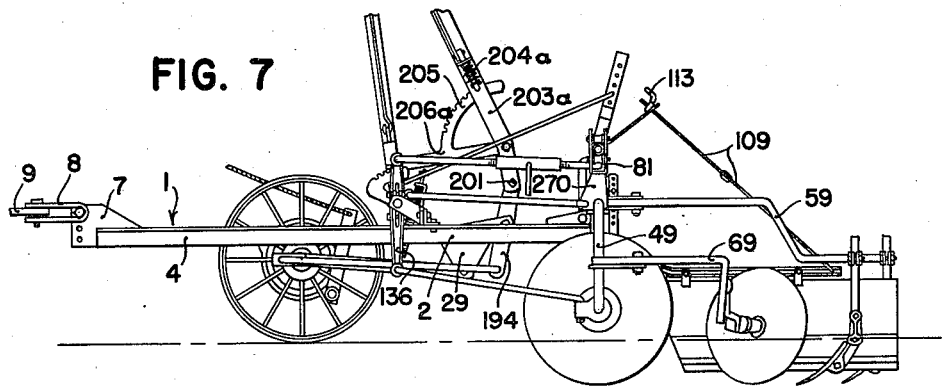
Figure 7 is a sectional view similar to Figure 6, showing the tools in operating position and also illustrating certain modifications.

Referring now to the drawings, more particularly to Figures 1 to 6, the reference numeral 1 indicates the frame of the implement in its entirety. The frame 1 comprises a pair of generally longitudinally extending frame bars 2 and 3 which at their forward ends are joined to, and preferably formed integral with, diagonally disposed forwardly convergent sections 4 and 5, the ends of which are bolted to a vertical hitch plate 7 to which a swiveled hitch member 8 is pivoted. The member 8 is supported, and hence supports the forward portion of the implement frame 1, on a tractor or other propelling means represented by the drawbar 9. The tractor is indicated by the reference character T in Figure 2. The implement frame 1 also includes a transversely disposed draft bar 12 which is secured, as by bolts 14 and braces 15 and 16, to the longitudinal frame bars 2 and 3, as best shown in Figure 1. Preferably, the braces 15 and 16 are bolted to the associated frame bars, as indicated at 19 and 20. Also, the convergent frame bar sections 4 and 5 are reenforced by diagonal braces 21 and 22, the forward ends of which are bolted, as at 24, to the bars 4 and 5. The rear ends of the braces 21 and 22 are bolted, as at 26 (Figure 6), to opposite sides of a vertical plate 27 which is connected to or formed integral with an upper portion 28 and a lower portion 29, to which reference will be made later. The rearmost ends of the braces are bolted, as at 30, to the upper or rear plate extension 28. As best shown in Figure 1, a pair of angle brackets 32 and 33 are bolted, as at 34, 35, to the transverse draft bar 12, and each angle bracket includes a lower flange 36 (Figure 6) which is apertured to receive the bolts 26, whereby the latter secures not only the rear ends of the braces 21 and 22, but also the plate 27 to the bar 12.

Operatively connected with the implement frame 1 are two pairs of laterally spaced lister cultivator units, indicated in Figure 1 by the reference numerals 41 to 44, the units 41 and 42 being disposed to the left side of the implement while the units 43 and 44 are disposed at the right side. Each unit is substantially identical with the other units and is operatively connected with the implement frame and other parts by means which is substantially the same for each of the units, and hence a description of only one unit and associated parts will be necessary.

Referring now more particularly to Figures 1, 2 and 6, it will be noted that each lister cultivator unit includes a pair of supporting wheels 47 and 48 journaled in laterally spaced apart relation on the lower ends of a pair of wheel standards 49 and 50 which form a part of the truck frame 51 of each unit. At their upper ends the wheel standards 49 and 50, which preferably are in the form of round bars bent laterally inwardly at their lower ends, as at 53 in Figures 2 and 6, are extended laterally inwardly to receive and rockably support a sleeve 54, which thus forms the connecting means of the truck frame 51 extending across the cultivator unit above the supporting wheels 47 and 48. The sleeve 54 has limited rocking movement on the upper laterally inwardly extending portions of the wheel standards and is operatively connected with the latter by any suitable means so as to tie the standards together to form the wheel truck or truck frame for accommodating the aforesaid limited rocking movement. Two pairs 55 and 56 of upper and lower plates are clamped by bolts 57 about the sleeve 54, the plates 55 and 56 being spaced apart vertically to receive a tool bar 59 therebetween. Each tool bar 59 is mounted for pivotal movement in a lateral direction about the bolt 57 as a pivot, and the plates 55 and 56 are provided with arcuate slots 61 in which a bolt 62 is disposed, the bolt 62 passing through the associated tool bar 59 and serving to fix the same in the position of lateral adjustment. At its rear end each of the tool bars is bent downwardly and is provided with suitable clamp means 64 by which a cultivator shank 65 is fixed to the associated tool bar. Each shank 65 carries a shovel or other tool 66. Thus, as best seen in Figure 1, the tool bars 59 of each unit may be adjusted to vary the lateral spacing between the tool means 66.

A second set of tool bars 69 is included in each lister cultivator unit. Each bar 69 is bifurcated at its forward end, as indicated at 70 in Figure 6, so as to embrace the associated wheel standard 49 or 50. Fixed to each wheel standard is a plate 71, preferably welded to the associated wheel standard, which, as best shown in Figure 1, is provided with a rearwardly widened section which is provided with an arcuate slot 72. A bolt 73 is carried by the bar 69 and is disposed in the slot 72. Tightening the bolt 73 clamps the associated tool bar 69 in laterally adjusted position. Each tool bar 69 carries a disk 75 at its rear end, and hence by setting the tool bars 69 in the proper position, the lateral spacing between the disks 75 may be adjusted. As shown in Figure 6, each tool bar 69 is bent downwardly, as at 69a, to receive the journal support 77 upon which the disks 75 are rotatably mounted.

Secured to each of the wheel standards 49 and 50 of each cultivator unit is a generally upwardly extending bracket 80, each bracket in effect forming an upward extension of the associated wheel standard. At its upper end each extension 80 carries a yoke 81 between the two branches of which is disposed a pair of vertically spaced rollers 82. As best shown in Figure 1, an equalizing bar 85 is received between the upper and lower rollers of the left-hand cultivator units 41 and 42, and since the equalizing bar 85 extends from one unit to the other, both are laterally stabilized and held against tipping in a lateral direction. A second stabilizing bar 86, preferably identical or substantially so with the equalizing bar 85, connects the corresponding wheel standard extensions of the right-hand cultivator units 43 and 44. Thus, the right-hand lister cultivator units are also stabilized against lateral tipping.

Referring now to Figure 3, a plate 90 is secured.

as by welding or the like, to the intermediate portion of the rockable sleeve 54. The plate 90 is extended rearwardly and is provided with one or more bolt holes to receive two bolts 92. Each lister cultivator unit includes a shield 93 for the purpose of preventing soil from rolling down onto young plants. Each shield is an inverted V-shaped member (Figures 1 and 2) and is secured by ears 94 to a shield-carrying bar 95, the forward end 96 of which, as is shown in Figure 3, extends upwardly and forwardly and is pivoted on a bolt 97 that is carried by the vertically adjustable shield-supporting member 98 supported in adjusted position by the bolts 92 from the plate 90. Preferably, the member 98 consists of two right and left hand bars 101 and 102 which, at their upper ends, are provided with a plurality of bolt holes and at their lower ends are curved downwardly rearwardly and then upwardly, as indicated at 103, the two curved portions of the bars 101 and 102 receiving the forward end of the shield supporting bar 95 therebetween, thereby serving as a guide for the pivotal movement of the bar 95. A stop 105 in the form of a bolt passing through the bars 101 and 102 and carrying a bushing therebetween, serves to limit the downward swinging movement of the shield supporting bar 95, as will be explained below. Normally in operation the bar 95 is disposed above the stop 105 and is held in proper adjusted position by a pair of chain links 109 connected at their lower ends, as at 110, to the outer or rear end of the shield bar 95 and at their upper end to an arm 111 which is fixed by a bolt 112 or any other suitable means to the equalizing bar associated therewith. Preferably, the upper end of the upper chain link is threaded and receives an adjusting screw-threaded member 113 by which minor adjustments in the vertical position of the rear end of the shields may be made. Also, as will be explained below, the equalizing bar may itself be rocked to raise and lower the shields about their points of pivotal connection, as at 97, with the vertically adjustable shield supporting members 98 that are carried upon the respective truck frames 51.

As mentioned above, normally the forward portion of the frame 1, together with associated parts carried thereby, is supported by the tractor drawbar 9. According to the present invention, the rear end of the frame 1 and associated parts are supported upon the four lister gangs 41 to 44 through the two equalizing bars 85 and 86 so that the frame weight at the rear of the implement is distributed equally to all four trucks, whereby the work of the several lister cultivator gangs is always uniform, yet the construction is such that the individual trucks are capable of relatively free individual movement so as to accommodate crooked or variable row widths and so that the bell wheels 47 and 48 of the several units are permitted to follow the row, regardless of variation, thereby holding the disks and shovels in proper positions with relation to the rows. Referring now to Figures 1 and 4, it will be seen that the rear end of each of the longitudinal frame bars 2 and 3 carries a journal sleeve casting 120 in which the lower and laterally outer directed end 121 of a supporting link 122 is received. The upper end of each of the supporting links 122 is directed rearwardly and is mounted for rocking movement in the upper sleeve section 125 of a swiveling member 126. The section 125 is disposed in a generally longitudinal direction, and the lower sleeve section 127 of each member 126 is mounted for rocking movement on the associated equalizing bar 85 or 86. Pins or cotter keys 128 serve to prevent the members 126 from shifting laterally relative to the equalizing bar that supports the same. Thus, by virtue of the swinging support means just described, the frame 1 is supported in substantially balanced relation on the two lister units at each side of the machine, the equalizing bars being capable of independent fore and aft swinging movement relative to the rear end of the associated frame bar, and also vertical swinging movement about a generally longitudinal axis. Cotter keys, pins or the like serve to keep the ends of the swinging links 122 in proper position within the associated journal sleeves.

Referring now to Figures 1, 3 and 6, the several lister cultivator units 41 to 44 are operatively connected in draft transmitting relation with the implement frame 1 by a series of generally parallel links which permit each unit to have individual generally vertical movement and by which the several units are tilted (see Figure 6) together to raise or lower the ground working tools. To this end a rock shaft 130 is mounted for rocking movement in a series of brackets 132 that are fixed, as by bolts 133, to the frame bar 12, preferably to the vertical flange thereof, as best shown in Figures 3 and 6. A pair of arms 135 and 136 are clamped, as by bolts 137 and 138 to the rock shaft so as to rock therewith. The lower end of each arm 135 and 136 is apertured and receives the forward end of a pair of lower links 140, the rear ends of which are directed downwardly, as at 141, and received in the apertured lug portion 142 of a bearing member 143 that is fixed to the lower end of the associated wheel standards 49, 50. The wheel standard extensions 80 are provided with forwardly disposed lug sections 145 in which the rear ends of a pair of links 146 are pivoted. The links 146 are disposed in a position extending substantially directly rearwardly from the rock shaft 130, being connected to the bolts 138, which are in the form of eye bolts to pivotally receive the forward ends of the links 146. Thus, the forward ends of the links are disposed above the rock shaft 130 only sufficient to permit the use of the bolts 138 as clamping members fixing the downwardly extending arms 135, 136 to the rock shaft 130. As a result of this construction, the upper portion of the truck frame 51, that is, the portion which carries the tools, does not experience any great amount of longitudinal movement when the rock shaft 130 is actuated to shift the lower links 140 forwardly or rearwardly in lowering or raising the tools. A third arm 148 is fixed, as by clamp bolts 149, to the rock shaft 130 between the depending arms 135 and 136. The upper end of the intermediate arm 148 is apertured to receive the forward end of a link member 151, the rear end of which is pivoted in an apertured lug 152 that is bolted, as at 153, to the plate 90 that is fixed to the rockable sleeve 54 to which the shovel bars 59 are fixed. The link member 151 comprises two parts 155 and 156, the adjacent ends of which are threaded into an adjusting sleeve 157. The sleeve 157 is apertured transversely to receive one end of a pendant arm 158 by which the sleeve 157 may be turned to adjust the effective length of the link member 151. To this end, the link sections 155 and 156 are provided with right and left hand threads, the sleeve 157 being similarly threaded. The depending character of the several arms 158 serves to prevent the adjusting sleeves 157 from accidentally turning out of adjustment.

It will be understood that each of the lister cultivator units 41 to 44 is provided with the above-described linkage. Therefore, rocking movement of the rock shaft 130 serves to swing all of said lister units 41 to 44 in the same direction. Moreover, the above described linkages will permit each lister unit to move vertically relative to the frame but is held against tilting in a vertical longitudinal plane, the parallel links 140, 146, 151 acting to keep the associated cultivator unit in any one of a number of parallel positions so long as the rock shaft 130 is held in any one position. As will also be readily understood, rocking of the rock shaft 130 will act through the links 140, 146 and 151 to cause substantially the same angular movement of the several truck frames and associated tools. The bars 59 serve as supporting means for the tools 66 and are swingable relative to the associated truck frame 51 by turning the sleeves 157, thus adjusting the effective length of the links 151. As best shown in Figures 2 and 6, each link member 151 remains generally parallel to the associated links 140 and 146 when the rock shaft 130 is rocked, whereby the tools 66 are raised and lowered with the disks 75.

Figure 6 shows the tool bars 59 and 69 in raised position, lifting the shovels 66 and the disks 75 out of ground engaging position. The preferred means for rocking the rock shaft 130 will be described below.

The several shields 93, which are connected by the links 109 and the arm 111 to the rockable equalizing bars 85 and 86, are not raised through the same angular extent as the tool bars 59 and 69. It will be remembered that the forward ends of the shield supporting bars 95 are pivoted, as at 97, to the vertically adjustable members 98 and that normally the stop 105 is out of engagement with the associated shield bar 95. As best shown in Figure 1, each of the equalizing bars 85 and 86 has fixed thereto, as by clamps 161, a rearwardly and upwardly extending arm 162 provided with a plurality of openings 163 (Figure 6). The rear end of a link 164 is disposed in one of the openings 163 in the associated arm 162, and the forward ends of the links 164 are connected, respectively, to adjusting levers 165 which are mounted for swinging movement about the adjacent portion of the rock shaft 130. If desired, the rock shaft 130 may be made in two separate sections, indicated in Figure 1 by the reference numerals 130a and 130b, with the lower ends of the levers 165 rockably mounted on the adjacent ends of the shaft sections 130a and 130b close to the brackets 132 supporting them. As best shown in Figure 5, a sector 170 has an end apertured to receive the associated rock shaft section and is bolted, as at 171, or otherwise secured to the adjacent bracket 132 so as to be held against movement. There is a sector 170 for each of the adjusting levers 165. A collar 173 is disposed on the shaft 130 adjacent the lower end of each of the levers 165, and each collar is provided with a set screw 174, so as to hold the associated lever 165 in the proper axial position on the shaft 130.

As will be clear from the above description, rocking one or the other, or both, of the adjusting levers 165, will rock the equalizing bar or bars associated therewith and will raise or lower the rear end of the shields 93. However, since the levers 165 do not swing with the rock shaft 130, as do the arms 136 and 148 described above, when the rock shaft 130 is rocked to tilt the various wheel trucks 51, the equalizing bars 85 and 86 are not rocked, except rocking movement in a clockwise direction (Figure 6) due to the fact that the yokes 81 carrying the equalizing bars are moved upwardly and forwardly, such rocking movement occurring because the links 164, to which the arms 162 fixed to the equalizing bars are pivoted, are held generally against longitudinal movement by the latching mechanism associated with the levers 165. The clockwise rotation of the equalizing bars relative to the trucks which support them thus cause a lowering of the rear ends of the equalizing bar arms 111. Without the provision of other means this would cause the rear ends of the shields 93 to lower when the tools are raised. However, according to the present invention, and as described above, the stop 105 associated with each of the shield bars 95 engage the latter when the wheel truck frames are rocked into the position shown in Figure 6, thereby lifting up the shield bars 95 and the shields associated therewith into a position above the ground. Since the arms 111 move downwardly, as just described, the links 109 buckle into the position shown in Figure 6. Briefly, then, the hand levers 165 are used to rock the equalizing bars 85 and 86 for the purpose of adjusting the position of the rear ends of the shields 93 when the implement is in operating position, that is, when the rear ends are supported by the links 109 on the equalizing bar arms 111, but when the tools are swung into their raised or transport positions, the stops 105 engage the shield supporting bars and hold the shields up while the equalizing bar arms 111 swing downwardly. As will be explained below, this action is present to a substantial degree even when the yokes 81 are not offset rearwardly but are disposed substantially above and in line with the wheel truck standards (see Figure 7).

The various truck frames of the lister cultivator units 41 to 44 may be tilted either by hand lift means or power lift means, as desired. Preferably, however, a power lift mechanism is utilized. Referring now more particularly to Figures 1 and 6, the reference numeral 180 indicates a wheel frame which is pivoted, as at 182, to the lower bracket extensions 29 of the plates 27. At the forward end the frame 180 receives a ground wheel 183 which is disposed between the forward diverging braces 21 and 22. The wheel frame 180 preferably consists of a pair of spaced bars 184 and 185 with suitable cross members as required. The ground wheel 183 is mounted on an axle which is carried by the forward ends of the wheel frame bars 184 and 185, and the wheel 183 serves to drive a half-revolution clutch indicated in its entirety by the reference numeral 190 in Figures 1 and 6. The clutch mechanism 190 is of conventional construction and hence the details have not been illustrated. It is therefore sufficient to note that the clutch mechanism 190 includes a driving member fixed to or connected with the wheel 183 and a driven member in the form of a crank 192 (Figure 6) which is connected by a link 193 to an arm 194 that is pivoted, as at 195, to the rear end section 28 of the plate 27. The pivot 182 for the wheel frame 180 is received in a pipe or bushing 197 fixed, as by welding, to the lower section 29 of the plate 27.

The upper end of the arm or lever 194 carries a pivot 201 upon which the lower end of a manually controlled lever 203 is carried. The lever 203 carries latch mechanism 204 which cooperates with a sector 205 firmly fixed to or carried by a link 206 which is connected by a bolt 207 to an arm 208 which is made up of a pair of arm members 210 and 211 (Figure 1) secured, respectively, to the left and right hand rock shaft sections 130a and 130b. The two arms sections 210 and 211 are connected together by a bolt 212. This connection is such that there is a certain amount of looseness to take care of flexing of the frame 1. The link 206 is pivoted to the lever 203 by a pivot pin or bolt 213. A pressure spring 215 is connected between a bracket 216 that is fixed to the transverse angle 12 and the wheel frame 180. The spring 215 surrounds and is mounted on a pin or rod 217 which is pivoted at its lower end on one of the cross braces of the frame 180. The upper end of the rod is slidably disposed in the upper end of the bracket 216, as best shown in Figure 6.

The lever 203 and the link 206 serves as means which link-connects the swinging lever 194 with the arm member 208 that rocks the rock shaft, and the effective length of such link means is adjusted by swinging the lever 203 after releasing the latch 204 from the sector 205. The forward end of the link 206 is provided with a plurality of openings 221 to receive the pivot bolt 207 in any one of a number of positions. The power lift clutch 190 is controlled by a rocking lever 225 to the outer end of which a cable 226 is fixed and which extends forwardly to the operator's station on the tractor T. A spring 227 acts against the trip lever 225 to hold it in a position to interrupt and disconnect the clutch after a half revolution.

In operation, when the lever 225 is tripped, the ground wheel 183 is operatively connected to swing the crank 192. This acts through the link 193 to swing the lever 194, and the rocking movement of this latter part acts through the link means 203, 206 to rock the rock shaft 130, thereby swinging the cultivator units from one position to the other. It will be noted that the lever 203 can be moved to different positions when the trip lever 225 holds the power lift mechanism disengaged. Thus, the lever 203 itself may be used to swing the tool bars from operating position to a raised position, or to any intermediate position, as desired. Since the forward end of the frame is supported on the tractor and the wheel 183 floatingly mounted, it will be seen that rough or irregular ground surface over which the outfit may pass, will not affect the efficiency of the raising and lowering means.

Figure 7 illustrates the working position of a lister cultivator implement, such as the one shown in Figures 1 to 6, and in addition shows certain detailed improvements and modifications which will now be described. Parts which are identical or substantially the same as the parts described above, will be indicated by the same reference numeral. In this form, the lever 203a is provided with latch means 204a that engages the sector of a link member 206a, the forward end of which is bent back upon itself, as at 235 (Figure 11). At the lower end of the lever 203a, the pivot bolt 201 is carried by an arm 237 fixed to a rock shaft 238. The latter is rockably supported in a pair of brackets 239, the lower portions 240 of which carry a pin 241 which serves as a pivot for the power lift wheel frame 180. A short section of a channel 244 is fixed to the central portion of the draft bar 12, and to the flanges of the channel section 244 the plates 239, 240 are fixed, as by bolts 243. Thus, like the form of the invention shown in Figure 6, when the hand lever is locked to the associated sector, the tools may be raised and lowered by power derived from the ground wheel 183, and when the power lift mechanism associated with the ground wheel is locked in stationary relation, adjustments may be made by swinging the main hand lever 203 or 203a.

Sometimes when in operation and the power lift means is operated to lower the tools into ground working position, one or more of the tools may strike the hard ground or some other object, with the result that that particular tool or tools is, at least momentarily, prevented from entering the ground, even though the forward movement of the outfit causes the power lift wheel 183 to continue to rotate. In order to insure that continued rotation will not break or twist any of the parts, I provide a cushioning arrangement which will now be described.

Figure 8:
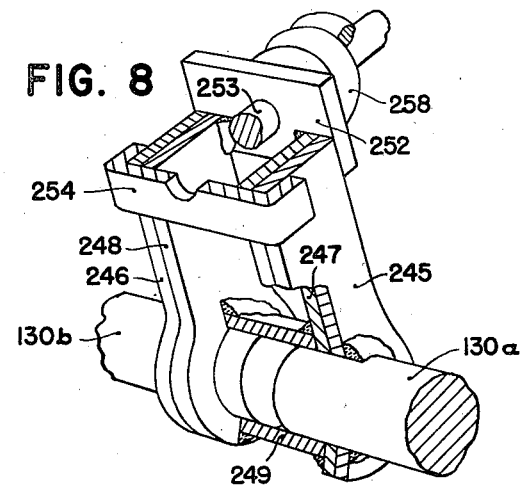
Figure 8 is a perspective view of the spring cushion connection between the mechanism for raising and lowering the tools and the rock shaft which is link-connected to the cultivator units.

Referring now more particularly to Figure 8, it will be seen that the adjacent ends of the rock shaft sections 130a and 130b have welded thereto short arms 245 and 246, respectively. A pair of inner arms 247 and 248 are secured, as by welding, to a center bushing or sleeve 249 in which the adjacent ends of the rock shaft sections 130a and 130b are disposed. The two arms 247 and 248 are thus capable of rocking movement relative to the outer arms 245 and 246. Welded to the rear edges of the arms 247 and 248 is a plate 252 which is apertured to receive a bolt 253. The head end of the bolt extends through the plate 252 and through a U-shaped member 254 which embraces the outer arms 245 and 246 and is apertured to receive the head end of the bolt 253. It will be noted that the member 254 is disposed at the forward side of the arms 245 and 248 and that the plate 252 is disposed rearwardly of the arms, being welded to the two inner arms 247 and 248 and in abutting relation with respect to the outer arms 245 and 246, thereby constituting a lost motion connection between the latter arms and the associated parts. A spring 258 is disposed in a rearwardly and upwardly inclined position on the bolt 253. One end of the spring bears against the plate 252 while the other end bears against an adjusting washer 259. The section 235 of the member 206 provides the offset relation to accommodate the spring 258 and permits it to extend generally rearwardly alongside the link 206.

In operation, when it is desired to lower the tools from the position shown in Figure 6 to the position shown generally in Figure 2, the lever 225 is tripped which connects the ground wheel with the crank 192. The forward rotation of the latter from the position shown in Figure 6 exerts a pull through the link 193 on the arm 194, and the upper end of the latter swings rearwardly and, acting through the lever 203, link 206, and arm 210, rocks the shaft 130, or the sections 130a and 130b, in a clockwise direction as viewed in Figure 6. This swings the wheel frames 51 to their vertical position (Figure 3) and lowers the tools.

The operation of the form shown in Figure 11 is substantially the same. The lever 225 trips the clutch 190 and the crank arm 192 swings forwardly and pulls through the link 193 against the arm 194a that is fixed to the outer end of the rock shaft 238, thereby rocking the arm 237 generally rearwardly. A pull is thus exerted through the link means 203, 206, 235 against the two inner arms 247 and 248, moving them rearwardly. Since the spring 258 bears at its forward end against the arms 247 and 248, the rearward movement of these arms acts through the spring 258 and the rod 253, which may be a bolt, to swing the outer arms 245 and 246, which are fixed to the rock shaft sections 130a and 130b. Therefore, if the tools should momentarily encounter hard ground or some obstruction when the power lift mechanism is actuated, the latter is permitted to move through its complete cycle, because the spring 253 will be compressed if the tools do not at once enter the ground to the depth determined by the position of the adjusting lever 203a.

Figure 7 also shows a modified form of wheel standard extension for supporting the equalizing bar or bars associated therewith for maintaining the cultivator units in upright position. In Figure 7 it will be seen that plates 270 are welded or otherwise fixed to the wheel standards 49 and 50 so as to extend directly in line therewith, instead of having a rearwardly offset relation as shown in Figure 6. The yokes 81 attached, as by welding, to the upper ends of the standard extensions 270, are substantially the same as the yokes 81 described above. Hence, the same reference numerals have been applied. In Figure 6, where the equalizing bars 85 and 86, and the rear end of the frame and associated parts that are supported by the equalizing bars, bear on the truck frames at points rearwardly of the bell wheels 47, little difficulty is encountered in lowering the tools into operating position, since the weight of the frame and associated parts aid in this action. On the other hand, the lifting operation may be more difficult because a part of the weight of the frame and associated parts must be raised when the tools are raised. This arrangement has proven satisfactory notwithstanding this fact, but under other conditions it may be objectionable to raise the frame when the tools are raised, and if that is the case then the construction shown in Figure 7 may be adapted where, as described, the standard extensions 270 upon which the equalizing bars 85 and 86 are carried extend substantially directly upwardly, the weight of the frame and associated parts being supported by the lister cultivator units in substantially balanced relation when the tools are in their operating position. When the tools are raised the rear end of the frame and associated parts are lowered slightly, thereby giving the advantage of raising the tools, rather than to the lowering of them, as in Figure 6. In the construction shown in Figure 7, slightly more power must be exerted to lower the tools than is required in Figure 6. However, at least a part of this additional power is supplied by the weight of the rearwardly overhanging tools and tool bars, together with the shields.

Figure 9:
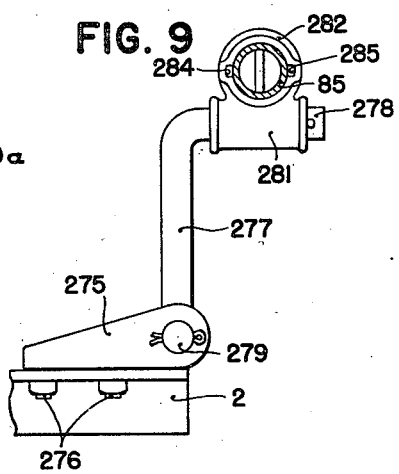
Figure 9 is a view, similar to Figure 4, but showing a modified form of swinging support connecting the implement frame with the equalizing bars.
Figure 10:
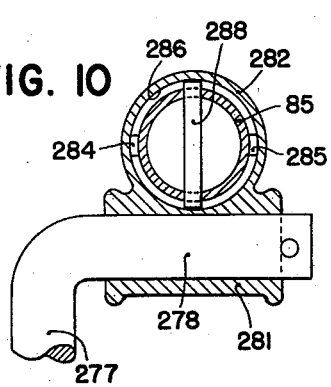
Figure 10 is a sectional view taken through the upper swivel connection shown in Figure 9.

In Figure 9 I have shown a slightly different form of swinging link means for supporting the rear ends of the longitudinal frame bars 2 and 3 from the equalizing bars. Referring now to Figure 9, a casting 275 is bolted, as at 276, to the rear end of each of the longitudinal frame bars 2 and 3, each casting having a sleeve section receiving the laterally outwardly turned end of a swinging link 277, which is somewhat shorter than the swinging links 122 described above in connection with Figure 1. The upper end 278 of each link extends rearwardly and is received in the lower longitudinally extending portion 281 of a swivel casting 282 which is mounted for rocking movement on the associated equalizing bar. The lower end of each link 277, which is received by the casting 275, is indicated by the reference numeral 279. As best shown in Figure 10, the casting 282 is formed with a pair of axial directed grooves 284 and 285 disposed in diametrically opposite relation along the inner surface of the upper portion of the member. Intermediate the ends of the upper portion a casting 282 is provided with an arcuate groove 286. The portion of the equalizing bar upon which the casting 282 is mounted carries a pin 288, held in the bar by any suitable means. Preferably the pin 288 is disposed vertically, and when assembling the parts the casting 282 is applied to its associated bar before the link 277 is attached. The casting is slipped over the end of the bar and turned so that the ends of the vertical pin 288 enter the grooves 284 and 285. When the casting has been moved over onto the pin 288 it is given a quarter turn, and then the ends of the pin enter the recesses or grooves 286. By virtue of this construction, the casting 282 is permitted to have rocking movement on the supporting equalizing bar but is restrained against axial movement. Attaching the upper end of the link 277 to the casting serves to hold the latter in position and prevents the casting from inadvertently turning into a position where the pin might enter the grooves 284 and 285.

Figure 12 illustrates means constructed according to the principles of the present invention for supporting the lever 203a (Figures 7, 8 and 11) when the power lift unit 180, 190 is not used. In this form, one of the pair of brackets 239 (Figure 11) is replaced by a single bracket 291, and is fixed by the right hand pair of bolts 243 between one flange of the channel section 244 and the right frame brace 22. Washers 292 are placed between the left flange of the channel section 244 and the other frame brace 21. The bracket 291 has a part 294 that extends laterally inwardly and upwardly and is apertured to receive the pivot bolt 201. The bracket 291 thus serves as a support for the lever 203a whereby swinging movement of the latter rocks the shaft 130 and raises and lowers the tools.

While I have shown and described above the preferred means embodying the present invention, it is to be understood that my invention is not to be limited to the particular structure shown and described above but that, in fact, widely different means may be employed in the practice of the broader aspects of my invention.

What I claim, therefore, and desire to secure by Letters Patent is:

1. A lister cultivator comprising a frame, a plurality of cultivator gangs, each including a wheel truck and tool supporting means swingable relative to the wheel truck, and means including substantially parallel link means connected with both said wheel truck and said tool supporting means and with said frame for causing both said truck and relatively movable tool supporting means to move substantially vertically relative to said frame.

2. A lister cultivator comprising a frame including at least two generally longitudinally extending frame bars and a transverse frame bar, a plurality of cultivator gangs, said longitudinal frame bars extending between certain of said gangs, means including vertically swingable parallel links connecting each of said gangs with said transverse frame bar, means connected with said parallel links for tilting said gangs in a generally fore and aft direction, and means swingably supporting the rear end of each of the two adjacent longitudinal frame bars on said gangs.

3. A lister cultivator comprising a frame including at least two generally longitudinally extending frame bars and a transverse frame bar, a plurality of cultivator gangs, said longitudinal frame bars extending between certain of said gangs, means connecting each of said gangs with said transverse frame bar, each of said cultivator gangs including an adjustable part, an equalizing bar supported for rocking movement on said gangs, the rear ends of said longitudinal frame bars being supported on said gangs through said equalizing bar, means on said frame for rocking said equalizing bar, and means connecting the latter with said part whereby rocking of the equalizing bar adjusts the position of said part.

4. A lister cultivator comprising a frame, a rock shaft mounted for rocking movement on said frame and including a pair of depending arms fixed to said rock shaft and a generally vertically upwardly extending arm, a plurality of cultivator gangs, each including tool means, and substantially parallel link means connecting each of said gangs with said pair of arms and said tool means with said vertically extending arm, whereby rocking of said shaft tilts the gangs and accommodates generally vertical floating movement of the gangs relative to said frame.

5. A lister cultivator as defined in claim 4, further characterized by said parallel links including pairs of links, the upper link of each of said pairs being pivotally connected to said rock shaft closely adjacent the axis of rocking movement thereof.

6. A lister cultivator comprising a frame, a plurality of tiltable lister cultivator units, each including a truck frame having a pair of generally upwardly disposed bar receiving extensions, equalizing bar means carried by the extensions of said units to hold the units laterally stable, and means supporting the rear portion of said frame on said equalizing bar means.

7. A lister cultivator as defined in claim 6, further characterized by each of said truck frames including a pair of laterally spaced wheel standards, said equalizing bar receiving extensions being fixed directly to said wheel standards.

8. A lister cultivator as defined in claim 6, further characterized by each of said truck frames including wheel receiving standards and a pair of supporting wheels journaled thereon, said bar receiving extensions being disposed substantially directly above said wheels, whereby the weight of the rear portion of said frame is imposed on said cultivator units in substantially balanced relation over said wheels.

9. A lister cultivator as defined in claim 6, further characterized by each of said truck frames including wheel receiving standards and a pair of supporting wheels journaled thereon, said equalizing bar receiving standards being offset rearwardly with respect to said wheels, whereby the weight of the rear portion of the frame is imposed on said cultivator units in a position to aid in forcing said tool means into the ground, each of said cultivator units including rearwardly extending soil working tool means.

10. A lister cultivator comprising a frame, including a transverse frame bar, a transverse rock shaft rockably mounted on said transverse frame bar, a plurality of cultivator units, a plurality of arms fixed to said shaft, and a pair of vertically spaced links pivotally connecting each cultivator unit with said frame bar, one link of each pair extending substantially directly rearwardly from said rock shaft and the other link extending rearwardly from and pivotally connected to the lower end of the associated arm, whereby rocking of the arms swings said cultivator units without causing substantial longitudinal movement of the upper links and the portions of said units to which the rear ends of the upper links are connected.

11. A lister cultivator comprising a frame, a rock shaft mounted for rocking movement on said frame and including a pair of depending arms fixed to said rock shaft and a generally vertically upwardly extending arm, a plurality of cultivator gangs, each including means serving as a wheel arch having depending standards, supporting wheels journaled thereon, and a transverse connecting section disposed vertically above said supporting wheels, a pair of substantially parallel links extending from each of said first-mentioned arms to the associated wheel truck standard, a sleeve member rockably mounted on the intermediate portion of said wheel truck means, tool means fixed to said sleeve member, an arm also fixed to said sleeve member, a link connecting said last mentioned arm with the vertically extending arm on said rock shaft, said last mentioned link means being disposed generally parallel with said pair of links, whereby rocking movement of said rock shaft causes said wheel arch means and said tool means to swing through substantially the same angle, and means for adjusting the effective length of said last mentioned link means for adjusting the position of said tool means.

12. In a lister cultivator, a cultivator gang comprising a pair of laterally spaced wheel standards, supporting wheels journaled for rotation on the lower ends of said standards, a member mounted for rocking movement on the upper ends of said standards, a sleeve mounted for rocking movement on said standards below said member, tool means adjustably fixed to said sleeve, a vertically adjustable shield operatively connected with said member, means for rocking said sleeve to adjust the position of tool means, and separate means for rocking said member.

13. A lister cultivator comprising a plurality of cultivator gangs, each of said gangs including a pair of laterally spaced wheel standards, a pair of supporting wheels journaled for rotation at the lower ends of said standards, an operating part pivotally mounted for generally vertical movement relative to said standards, equalizing bar receiving means at the upper ends of said standards, an equalizing bar connecting said gangs and supported for rocking movement on said equalizing bar receiving means, a plurality of arms fixed to said equalizing bar, one for each of said gangs, each arm being fixed to said equalizing bar between the standards of the associated gang, means operatively connecting the outer end of each arm with the associated operating part, and means for rocking said equalizing bar to adjust the position of all of said operating parts.

14. A lister cultivator comprising a frame, a transverse rock shaft mounted thereon, a plurality of cultivator gangs, each including a wheel truck having means serving as a wheel arch and supporting wheels journaled on the lower ends thereof, and tool carrying means journaled for limited rocking movement on the central portion of said wheel arch means, at least one pair of substantially parallel links connecting said wheel arch with said rock shaft, whereby rocking movement of the latter swings said wheel arch in a generally fore and aft direction, link means disposed substantially parallel to said first mentioned link means for operatively connecting said rock shaft with said tool supporting means, whereby both said wheel truck and said tool supporting means may shift vertically relative to said rock shaft without causing relative movement between said tool supporting means and said wheel truck, means for rocking said rock shaft to swing said wheel truck in a generally fore and aft direction and said tool supporting means in a generally vertical direction, and means for adjusting the effective length of said second mentioned link means, whereby to adjust the position of said tool supporting means relative to said wheel truck.

15. A lister cultivator comprising a frame, a plurality of lister cultivator gangs movably connected with said frame so as to be capable of being swung from one position to another, means on the frame for swinging said gangs, means for supporting said frame, a ground wheel separate from said frame supporting means and floatingly connected with said frame, and means operated by said wheel for actuating said gang swinging means.

16. A tractor propelled implement, the combination of a frame including generally longitudinally extending members having their forward ends disposed in converging relation and a transverse frame bar, a plurality of earth working units movable into and out of earth working position, means operatively connecting said units with said transverse draft bar, means on said frame for raising and lowering said tools, means supporting the rear ends of said longitudinal frame bars on said tools, the forward end of said frame being supported on the tractor, a ground engaging wheel floatingly connected with said frame in a position between the forwardly converging portions of said frame bars, and means operatively driven by said wheel for raising said tools.

17. An agricultural implement comprising a frame, a pair of separately movable members mounted for rocking movement on said frame, a pair of tool units movably connected with said frame, means respectively connecting said tool units and said members whereby rocking movement of the latter adjusts the position of said tool units, an arm mounted for rocking movement on said frame, power lift means operatively connected to rock said arm, an arm fixed to each of said members, an adjusting lever pivoted on said first arm, and means operatively connecting said lever with both of said other arms, whereby movement of said lever is effective to adjust the position of both of said tool units.

18. A lister cultivator comprising a frame, a plurality of tiltable lister cultivator units, link means operatively connecting said units with said frame, a rock shaft supported for rocking movement on said frame and operatively connected with said links whereby rocking movement of said rock shaft adjusts the position of said lister cultivator units, an arm fixed to said rock shaft, a second arm pivoted on said frame, power lift means connected with said second arm for rocking the same, an adjusting lever operatively pivoted to one of said arms, latch means carried by said lever, and a sector member pivotally connecting said lever with the other arm, said sector having a section with which said latch means cooperates in locking said member and said lever against relative movement, said lever reacting against said power lift for adjusting the position of said units.

19. An agricultural implement comprising a frame, a plurality of units movably connected therewith, a pair of rock shafts journaled for rocking movement on said frame and operatively connected with said plurality of units for adjusting the position of all of said units, an arm on each rock shaft, said arms being disposed adjacent each other, a cushioned member acting against both of said arms, and means acting through said member against both of said arms for moving all of said cultivator units into operating position.

20. An agricultural implement comprising a frame, a plurality of units movably connected therewith, means including a pair of coaxial separately movable rock shafts mounted on said frame and connected, respectively, with said units for adjusting the position thereof, a pair of arms connected, respectively, with the adjacent ends of said coaxial rock shafts, a second arm means mounted for pivotal movement alongside said pair of arms, mechanism for rocking said rock shafts operatively connected with said second arm means, and a spring cushion connection acting between said mechanism and both of said arms whereby operation of said mechanism acts through said cushion means for rocking said rock shafts in one direction and thereby adjusting all of said cultivator units.

21. A lister cultivator comprising a frame having a laterally extending draft bar, two pairs of lister cultivator units tiltably connected with said frame, an equalizing bar rockably mounted on the two units of each pair, an arm fixed to each equalizing bar adjacent its inner end, each of said cultivator units including an adjustable part, means operatively connecting said part with said rockable equalizing bar associated therewith, a rock shaft mounted on said draft bar, means operatively connecting said rock shaft with said cultivator units for adjusting the position thereof, a pair of hand levers pivotally mounted on said rock shaft adjacent the central portion thereof, a pair of brackets rockably supporting the central portion of said rock shaft on said draft bar, a sector fixed to each of said brackets, latch means carried by each of said levers and cooperating with the associated sector, and means connecting said levers, respectively, with the arms carried by said rockable equalizing bars.

22. A lister cultivator comprising a plurality of lister cultivator units, each including a truck frame having a pair of upstanding arms fixed thereto, equalizing bar means supported on the upper portions of said arms for stabilizing said units, a draft frame, means movably connecting said units with said draft frame, and means swingably supporting the rear portion of said draft frame on said equalizing bar means.

23. A lister cultivator comprising a plurality of lister cultivator units, each including a truck frame, equalizing bar means movably connected with said truck frames for stabilizing said units, a draft frame, means movably connecting said units with said draft frame, and means supporting the rear portion of said draft frame on said equalizing bar means comprising a pair of link members, each having a laterally directed section at its lower end journaled for rocking movement in a generally longitudinal direction on the rear portion of said frame, the upper end of each of said links including a longitudinally directed section, and a member mounted for rocking movement on said equalizing bar means and including a transverse sleeve section that extends generally longitudinally of the lister cultivator for receiving said longitudinally extending portion at the upper end of each link, whereby said frame may shift laterally or longitudinally relative to the equalizing bar, and means for preventing each of said last mentioned members from shifting longitudinally on the associated equalizing bar.

24. In an agricultural implement, means serving as a wheel supported frame, a pair of laterally spaced ground engaging tools operatively connected with said frame, a shield disposed between said tools, a member to which the forward end of said shield is pivotally connected, means fixing said member to said frame means in adjusted position, and means on the frame for raising and lowering said shield in any position of adjustment of said member.

25. A cultivator gang comprising means serving as a wheel supported truck frame, a pair of laterally spaced ground engaging tools operatively connected with said truck frame, a shield disposed between said tools, a member to which the forward end of said shield is pivotally connected, means fixing said member to said truck frame means in adjusted position, means on said truck frame means for raising and lowering said shield about its pivotal support on said vertically adjustable member, and means carried by the latter and spaced from said pivot for guiding said shield when it is swung generally vertically.

26. In a lister cultivator, a lister cultivator gang comprising means serving as a vertically disposed wheel supported truck frame, rearwardly extending tool means fixed to said truck frame means, means for tilting said truck frame so as to raise said tool means out of engagement with the ground, a shield pivotally connected at its forward end with said truck frame means, means connected with the rear end of said shield and reacting against said truck frame means for raising and lowering said shield when said tool means is in operating position, and means serving as a stop carried by said truck frame and engageable with said shield for raising the latter when said truck frame is tilted.

27. In a lister cultivator, the combination with a cultivator gang of a shield, a shield supporting bar fixed thereto, a member pivotally receiving said shield supporting bar, said member comprising a pair of laterally spaced bars adapted to be fixed to said gang in any one of a plurality of vertical positions, said members carrying a pivot upon which the forward end of said shield supporting bar is received, and means at the lower ends of said vertically adjustable bars disposed on opposite sides of said shield supporting bar for guiding the latter in its pivotal movement relative to said shield supporting member.

28. The invention as defined in claim 27, further characterized by a stop member carried by said vertically adjustable members for limiting the swinging movement of said shield relative thereto.

29. In a lister cultivator, a cultivator gang comprising a pair of laterally spaced wheel standards, supporting wheels journaled on the lower ends of said standards, laterally inwardly extending parts carried by said standards above said wheels, a sleeve rockably supported on said laterally inwardly extending parts, earth working tools fixed to said standards, a second set of earth working tools fixed to said sleeve and means for rocking said sleeve relative to said standards to adjust the position of said first mentioned tools relative to said second set of tools.

30. A lister cultivator comprising a pair of gangs, each gang comprising a truck frame, and a shield mounted for rocking movement on said frame, a rock shaft carried by both of said truck frames, means connecting said rock shaft with each of said truck frames so as to accommodate movement of the latter, one relative to the other, means connecting said rock shaft with both of said shields for adjusting the position of the latter by rocking movement of said rock shaft in different positions of the truck frames, one relative to the other, and means for rocking said rock shaft.

31. A lister cultivator gang comprising a truck frame, a shield, a part adjustably connected with said truck frame for pivotally receiving the forward end of said shield, a rock shaft disposed on said truck frame, an arm fixed to said rock shaft and operatively connected with the rear end of said shield for adjusting the position of the latter, and means for rocking said rock shaft.

32. A lister cultivator comprising a frame, a plurality of gangs, each including a wheel truck and tool supporting means swingable relative to the wheel truck, generally vertically swingable parallel link means connected between said wheel truck and said frame to provide for generally vertical floating movement of said wheel truck relative to said frame, and separate generally vertically swingable link means parallel with respect to said first mentioned link means connected between said frame and said tool supporting means for holding the latter in substantially the same position relative to the wheel truck during vertical movement of the latter relative to the frame, and means for shifting said separate link means for adjusting the position of said tool supporting means relative to said truck.

33. A lister cultivator comprising a frame including at least two generally longitudinally extending frame bars and a transverse frame bar, a plurality of cultivator gangs, parallel link means connecting each of said gangs with said transverse frame bar, said parallel link means including at least two vertically spaced and vertically swingable links connected between said transverse frame bar and the associated gang and accommodating vertical swinging movement of the latter relative to said frame, and means swingably supporting the rear ends of said longitudinal frame bars on said gangs.

34. A lister cultivator comprising frame means including a transverse frame bar and a generally longitudinally extending frame member, a plurality of cultivator gangs, each including a vertically adjustable part, an equalizing bar supported for rocking movement on said gangs, the rear end of said longitudinal frame member being supported on said gangs through said equalizing bar, means for rocking the latter, and means connecting said equalizing bar with said vertically adjustable part whereby rocking of the equalizing bar adjusts the position of said part.

35. A lister cultivator comprising a plurality of cultivator gangs, each including an adjustable part, an equalizing bar supported for rocking movement on said gangs and serving to stabilize the latter, means for rocking said equalizing bar on said gangs, and means connecting the equalizing bar with the adjustable part of each gang, whereby rocking of the equalizing bar adjusts the positions of said parts.

36. A lister cultivator comprising a plurality of cultivator gangs, a shield movably connected with each gang, equalizing bar means connected with said gangs for holding the latter in operating position, means for rocking said equalizing bar means, and means connecting the latter with the shields for adjusting the position thereof.

37. A lister cultivator comprising a frame, a plurality of cultivator gangs movably connected therewith, each of said gangs including an adjustable part, an equalizing bar supported for rocking movement on said gangs and serving to stabilize the latter, means on said frame for rocking said equalizing bar, and means connecting the latter with said parts whereby rocking of the equalizing bar adjusts the positions of said parts.

38. A lister cultivator comprising a frame, a rock shaft mounted for rocking movement on said frame and including a pair of depending arms fixed to said rock shaft and a generally vertically upwardly extending arm, a plurality of cultivator gangs, each including tool means, two pairs of parallel links connected in vertically spaced relation with each gang, the lower links of said pairs being connected, respectively, with said depending arms, a separate link, extending generally in parallelism with said pairs of links, extending from said tool means to said upwardly extending arm, whereby rocking movement of said shaft tilts the gangs and associated tool means and accommodates generally vertical floating movement of the gangs relative to said frame, and means for adjusting the effective length of each of said separate links for adjusting the position of said tool means.

39. A lister cultivator comprising a frame, including a transverse frame bar, a transverse rock shaft rockably mounted on said transverse frame bar, a plurality of cultivator units, a plurality of arms fixed to said shaft, and a pair of vertically spaced links pivotally connecting each cultivator unit with said frame, one link of each pair extending rearwardly from and pivotally connected to the lower end of the associated arm and the other link being connected with the cultivator frame so as to be held against substantial longitudinal movement, whereby rocking of the arms swings the cultivator units without causing substantial longitudinal movement of the upper links and the portions of said unit to which the rear ends of the upper links are connected.

40. A lister cultivator comprising a frame, a rock shaft mounted for rocking movement on said frame and including a pair of depending arms fixed to said rock shaft and a generally vertically upwardly extending arm, a plurality of cultivator gangs, each including means serving as a wheel arch and a sleeve member rockably mounted on said gang, a pair of substantially parallel links extending from said wheel arch to said frame, including a link connected with each of said depending arms, tool means fixed to said sleeve member, an arm also fixed to siad sleeve member, a link connecting said last mentioned arm with the vertically extending arm on said rock shaft, said last mentioned link being disposed generally parallel with said pair of links, whereby rocking movement of said rock shaft causes said wheel arch means and said tool means to swing through substantially the same angle, and means for adjusting the effective length of said last mentioned link means for adjusting the position of said tool means.

41. An agricultural implement comprising means serving as a frame, supporting means therefor, tool means movably connected with said frame means and adapted to be raised and lowered into and out of transport position, a ground wheel floatingly connected with said frame means, and means for actuating said raising and lowering means from said floating ground wheel.

42. A tractor propelled implement comprising frame means the forward end of which is supported on the tractor, ground engaging means supporting the rear of said frame means, tools movably carried by said frame means, a ground wheel floatingly connected with said frame means, and means driven by said floating ground wheel for raising said tools.

43. An agricultural implement comprising a frame, tool means movably connected therewith, an arm connected with said tool means for adjusting the position thereof, a second arm pivoted on said frame, power lift means connected with said second arm for rocking the same, an adjusting lever operatively pivoted to one of said arms, latch means carried by said lever, and a sector member pivotally connecting said lever with the other arm, said sector having a section with which said latch means cooperates in locking said member and said lever against relative movement, said lever reacting against said power lift for adjusting the position of said tool means.

44. An agricultural implement comprising a frame, a rock shaft mounted for rocking movement on said frame, tool means movably connected with said frame, means connecting said tool means and said rock shaft whereby rocking movement of the latter adjusts the position of said tool means, arm means fixed to said rock shaft, an arm mounted on said frame, an adjusting lever pivoted to said arm, latch means carried by said lever, and a sector member pivotally connecting said lever with said arm means, said sector having a section with which said latch means cooperates in locking said member and said lever against relative movement, said lever reacting against said arm for adjusting the position of said units.

45. An agricultural implement as defined in claim 44, further characterized by power lift means connected to rock said arm so as to shift both said lever and said sector member for adjusting said units by power.

46. A lister cultivator comprising a frame having a laterally extending draft bar, two pairs of lister cultivator units tiltably connected with said frame, an equalizing bar rockably mounted on the two units of each pair, an arm fixed to each equalizing bar adjacent its inner end, each of said cultivator units including an adjustable part, means operatively connecting said part with said rockable equalizing bar associated therewith, and means connected with the arms at the inner ends of said equalizing bars for rocking the latter to position the adjustable parts of said cultivator units.

47. In an agricultural implement, frame means, rock shaft means thereon, a pair of hand levers pivotally mounted on said rock shaft means, a pair of brackets rockably supporting said rock shaft means on said frame, a sector fixed to each of said brackets, latch means carried by each of said levers and cooperating with the associated sector, means associated with said frame and adjustable relative thereto, and means connecting said levers with said adjustable means.

48. In an agricultural implement, frame means, a rock shaft thereon, a hand lever pivotally mounted on said rock shaft, a bracket rockably supporting said rock shaft on said frame means, a sector fixed to said bracket, latch means carried by said lever and cooperating with said sector, means adapted to be adjusted relative to said frame means, and means connecting said lever with said adjustable means.

49. A lister cultivator comprising a plurality of cultivator units, each including a truck frame having downwardly extending wheel standards and bar receiving arms extending substantially directly upwardly and disposed in the transverse vertical plane containing said wheel standards, equalizing bar means supported on said arms for stabilizing said units, a draft frame, means movably connecting said units with said draft frame, and means supporting the rear portion of said draft frame on said equalizing bar means.

50. A lister cultivator comprising a plurality of lister cultivator units, each including a truck frame having downwardly extending wheel standards and bar receiving arms extending rearwardly and upwardly therefrom, the upper ends of said arms being disposed rearwardly of the vertical transverse plane of said wheel standards, equalizing bar means supported on the upper ends of said arms for stabilizing said units, a draft frame, means movably connecting said units with said draft frame, and means swingably supporting the rear portion of said draft frame on said equalizing bar means.

51. In a lister cultivator comprising a plurality of lister cultivator units, a draft frame, and an equalizing bar connected with said units for stabilizing the same, means supporting at least a portion of the draft frame on said equalizing bar, comprising a link member having a laterally directed section at its lower end journaled for rocking movement in a generally longitudinal direction on the rear portion of said draft frame, the upper end of said links including a longitudinally directed section, and a member mounted for rocking movement on said equalizing bar means and including a transverse sleeve section for receiving the longitudinally directed section of said link.

52. In a lister cultivator comprising a plurality of lister cultivator units, a draft frame, and an equalizing bar connected with said units for stabilizing the same, means supporting at least a portion of the draft frame on said equalizing bar, a link member having a laterally directed section at one end and journaled for rocking movement on said frame, the other end of said link including a longitudinally directed section, and a member mounted for rocking movement on said equalizing bar and including a sleeve portion for receiving the section at one end of said link member, whereby said frame may shift laterally or longitudinally relative to the equalizing bar.

53. In a lister cultivator, means serving as a wheel supported truck frame, a pair of laterally spaced ground engaging tools operatively connected with said truck frame, a shield disposed between said tools, a member vertically adjustable relative to said truck frame, means movably connecting one end of said shield to said vertically adjustable member, whereby movement of the latter adjusts the position of said end of said shield, and means for raising and lowering the other end of said shield.

54. A lister cultivator comprising a frame, a pair of cultivator gangs, means including a pair of laterally spaced laterally swingable links connecting each gang with said frame, an equalizing bar connected with said gangs for stabilizing the latter and accommodating relative lateral movement thereof, said links causing said gangs to take successive generally parallel positions and thereby minimizing angular displacement of said equalizing bar when one of said gangs moves relative to the other, and means supporting at least a part of the weight of the frame on said equalizing bar.

55. An agricultural implement as set forth in claim 24, further characterized by means on said frame means engageable with the shield at a point spaced from its pivotal connection with said adjustable member for restraining lateral movement of said shield when it is swung about its pivotal support on said member.

56. In a lister cultivator, a lister cultivator gang comprising a truck frame having rearwardly extending tool means connected thereto, means for tilting said truck frame so as to raise said tool means out of engagement with the ground, a shield pivotally connected at its forward end with said truck frame means, means for raising said shield, and means separate from said raising means and serving as a stop engageable with said shield for raising the latter when said truck frame is tilted.

57. In a lister cultivator, the combination with a cultivator gang of a shield, a shield supporting bar fixed thereto, a member pivotally receiving said shield supporting bar, said member comprising a pair of laterally spaced bars, said members carrying a pivot upon which the forward end of said shield supporting bar is received, and means at the lower ends of said bars disposed on opposite sides of said shield supporting bar for guiding the latter in its pivotal movement relative to said shield supporting member.

58. In a lister cultivator, a cultivator gang comprising a pair of laterally spaced wheel standards, supporting wheels journaled on the lower ends of said standards, laterally inwardly extending parts carried by said standards above said wheels, a sleeve rockably supported on said laterally inwardly extending parts, earth working tool means fixed to said sleeve and means for rocking said sleeve relative to said standards to adjust the position of said tool means.

59. A lister cultivator comprising a frame, a transverse rock shaft mounted thereon, a plurality of cultivator gangs, each including a wheel truck and tool supporting means swingable relative to the wheel truck, means including substantially parallel link means connecting said wheel truck and the tool supporting means with said rock shaft, whereby rocking of the latter swings said wheel truck and tool supporting means, and means for swinging said tool supporting means relative to said wheel truck.

60. A lister cultivator comprising a cultivator gang unit having a part to be adjusted, a stabilizing bar for said gang, means connecting said bar with said part, and means acting against said bar to adjust said part.

61. A lister cultivator comprising a frame, a plurality of gangs, each including a wheel truck and tool supporting means swingable relative to the wheel truck, link means connected between said wheel truck and said frame, and separate link means parallel with respect to said first mentioned link means connected between said frame and said tool supporting means, and means for adjusting the effective length of said separate link means for adjusting the position of said tool supporting means relative to said truck.

62. A lister cultivator comprising a frame, a cultivator gang including a truck frame operatively connected with said cultivator frame and carrying tool supporting means rockable relative to the truck frame, rockable means on the cultivator frame, and means operatively connecting said rockable means with said tool supporting means for shifting the latter relative to said truck frame.

WALTER H. SILVER.

CERTIFICATE OF CORRECTION.

Patent No. 2,323,683.                                                July 6, 1943.

WALTER H. SILVER.

It is hereby certified that error appears in the printed specification of the above numbered patent requiring correction as follows: Page 6, second column, line 74-75, claim 2, for "the two adjacent longitudinal frame bars on said gangs." read --said longitudinal frame bars on the two adjacent gangs.--; page 10, first column, line 68, for "siad" before "sleeve" read --said--; and that the said Letters Patent should be read with this correction therein that the same may conform to the record of the case in the Patent Office.

Signed and sealed this 17th day of August, A. D. 1943.

(Seal))
Henry Van Arsdale,
Acting Commissioner of Patents.